3,812,030
PROCESS FOR THE TRANSPORTATION OF ACID GASES IN NATURAL GAS LIQUIDS STREAMS
Harris A. Clay, Bartlesville, Okla., assignor to Phillips Petroleum Company
Filed Oct. 13, 1972, Ser. No. 297,361
Int. Cl. C10g 5/00
U.S. Cl. 208—340
9 Claims

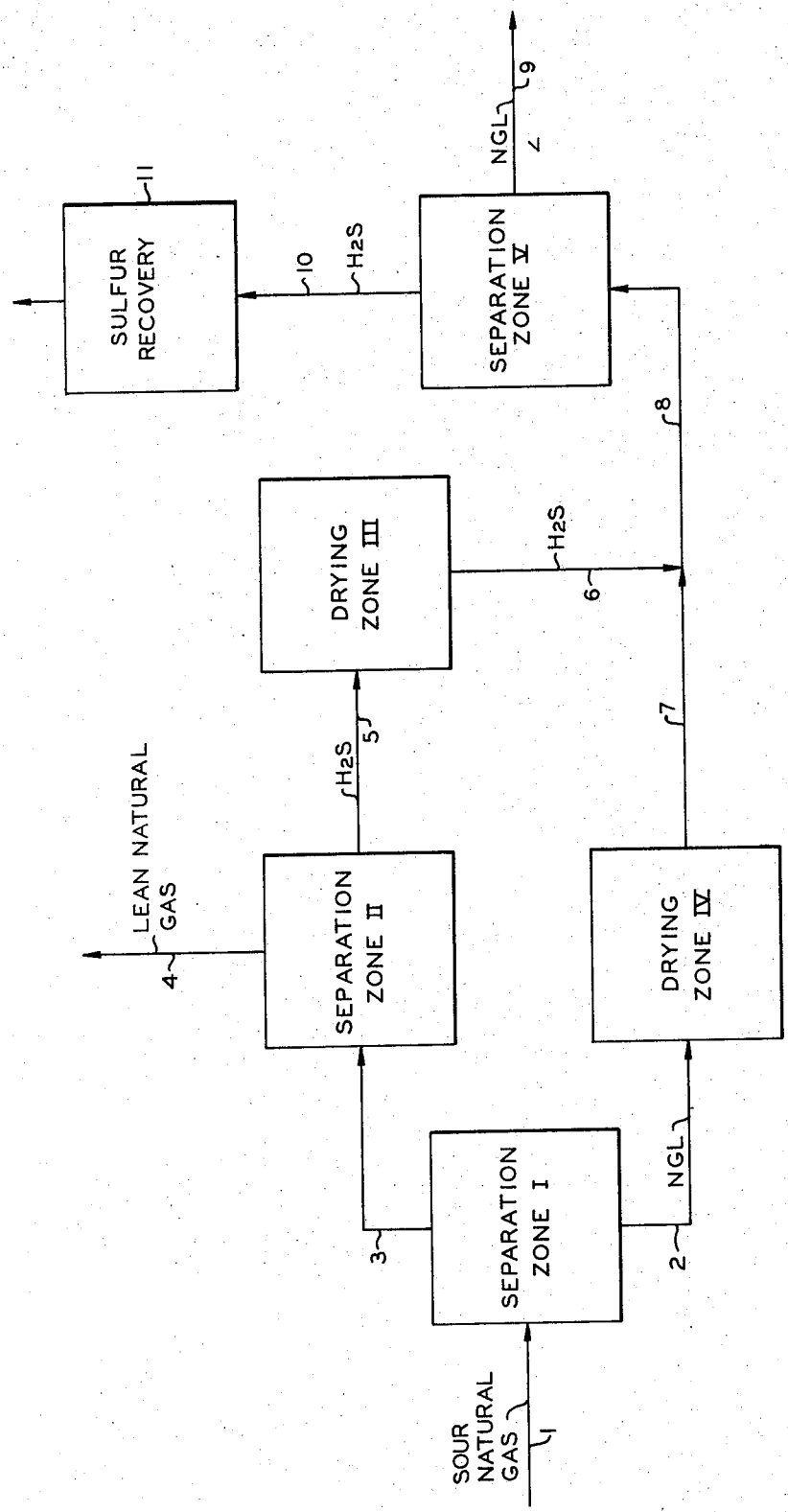

ABSTRACT OF THE DISCLOSURE

A process for the preparation and transportation of an at least partially dehydrated acid gas/natural gas liquids mixture is described which comprises separating a sour field natural gas stream into a natural gas stream, an acid gas stream and a natural gas liquids stream, drying the separated acid gas stream and natural gas liquids stream, mixing the dried acid gas stream and dried natural gas liquids stream, transporting the dried acid gas and natural gas liquids mixture through a pipe line to a separation zone and recovering therein the acid gas content of said gas and natural gas liquids mixture.

---

This invention relates to a process for the fractional separation of a sour field natural gas stream, dehydration and transportation of the resulting acid gas stream and the natural gas liquids stream, and the recovery of the elemental sulfur contained within the dehydrated acid gas and natural gas liquids mixture.

The acid gas content of a sour field natural gas stream is customarily separated from the lean natural gas after treating the field natural gas streams to recover the natural gas liquids. Providing the sulfur content of the acid gas stream is sufficient to permit economical recovery of elemental sulfur, a sulfur plant is frequently located at or near the source of the sour natural gas stream. In the absence of sufficient field acid gas sulfur to justify a sulfur plant adjacent or close to the natural gas field, the acid gases are frequently oxidized to sulfur dioxide and vented to the atmosphere. In view of the continuing public and private interest in reducing air pollution, it is anticipated that the disposal of acid gas sulfur in the form of sulfur dioxide near the natural gas fields may soon be restricted or prohobited entirely. Accordingly, determination of suitable alternatives to venting of acid gases to the atmosphere at or near the natural gas fields or to erecting uneconomical inefficient, undersized sulfur recovery production facilities near the field natural gas source is of immediate interest to both the general public and the natural gas processing industry at large.

According to this invention, a process is provided comprising the fractional separation of a sour field natural gas stream into a lean natural gas stream, an acid gas stream, and a natural gas liquids stream, dehydration of the acid gas and natural gas liquids streams, combination of the dehydrated acid gas and natural gas liquids streams, and transportation of the dehydrated mixture through a pipe line to location having facilities for recovery of the acid gas content of said mixture.

It is an object of this invention to provide a process for the separation and transportation of the acid gas content of field natural gas streams from a natural gas processing plant to a distant process center for the recovery therefrom of elemental sulfur or sulfur compounds under economical process conditions. Still another object is to provide a process for the transportation of acid gas components to a process center via existing natural gas liquids pipe lines. Another object is to avoid venting of acid gas components and/or the oxides thereof to the atmosphere. These and other objects will be apparent from the written description, the drawing, and the appended claims.

In general, in accordance with the practice of this invention, the sour field natural gas stream is fractionally separated at a natural gas field processing installation to provide a lean natural gas stream, an acid gas stream and a natural gas liquids stream. After separation, both the acid gas stream and the natural gas liquids stream are suitably and sufficiently dehydrated in order to reduce the water content of any combination of the acid gas and natural gas liquids to quantities which limit any appreciable formation of corrosive acids, such as hydrosulfuric acid or carbonic acid. Generally, acid gas and natural gas liquids mixtures that are substantially free of water, e.g., contain less than 100 p.p.m. of water, can be transported over long distances to another separation zone without promoting or significantly affecting the service life of the equipment, i.e., pumps, pipe lines, etc., employed for transportation of the mixtures to the other separation zones. Preferably, the acid gas and natural gas liquids streams are sufficiently dried to provide stream mixtures containing about 50 p.p.m. or less water, more preferably mixtures essentially free of water, i.e., about 1 p.p.m. of water. Still more preferred are mixtures of acid gases and natural gas liquids which contain no measurable amount of moisture, i.e., less than 1 p.p.m.

The process of this invention will be described in greater detail with reference to the accompanying drawing which illustrates by means of a schematic drawing an exemplary process embodying the present invention.

Referring now to the single FIGURE, in which the separation processes employed in the separation zones comprise any of the fundamental separation processes common and well known to those skilled in the art, a sour field natural gas stream 1 containing natural gas, natural gas liquids, and acid gas constituents is introduced into separation zone I wherein a natural gas liquids stream 2 is separated from a sour lean natural gas stream 3 which contains methane, and a small amount of ethane and heavier hydrocarbons not removed in zone I, and acid gases, such as hydrogen sulfide, carbon dioxide and occasionally carbonyl sulfide. Stream 3 may also contain nitrogen and helium. The sour lean natural gas stream 3 is passed to separation zone II where it is separated into an essentially acid gas free lean natural gas product stream 4 suitable for delivery to a pipe line as domestic fuel and an acid gas stream 5. The acid gas stream 5 passed to drying zone III where it is dried to produce dehydrated acid gas stream 6.

The natural gas liquids stream 2 is dried in drying zone IV to produce a dehydrated natural gas liquids stream 7. Streams 6 and 7 are mixed to produce stream 8 which at this point is sufficiently dry to be essentially noncorrosive. A moisture content of 50 p.p.m. or less is generally satisfactory. Liquid stream 8 may then be transported through a pipe line for long distances to separation zone V where it is separated into an acid gas free natural gas liquids stream 9 and an acid gas stream 10. The acid gas stream 10 may then be sent to a plant 11 wherein the acid gas sulfur content is recovered as elemental sulfur, sulfur dioxide, sulfuric acid or other valuable products. Plant 11 can employ a typical sulfur recovery process, e.g., see Petroleum Refining Engineering, W. L. Nelson, 4th Edition, pages 756–758, 1958, McGraw Hill Inc., N.Y.)

Examples of typical fundamental separation processes well known to the art that can be employed in the various process zones described hereinbefore are as follows:

Zone I, oil absorption of natural gas liquids followed by steam stripping (see Natural Gas and Natural Gasoline, R. L. Huntington, 1st Edition, pp. 76–77, 1950, McGraw Hill Inc., N.Y.)

Zone II, absorption of acid gases employing mono and diethanol amines or other suitable solvents followed by steam stripping (see Perry's Handbook for Chemical Engineers, 4th Edition, page 14–2, 1963, McGraw Hill Inc., N.Y.)

Zone III, separation of water from the acid gases employing bauxite driers which can be conveniently regenerated, or any other suitbale drying process (see Natural Gas and Natural Gasoline, ibid., pp. 348–354).

Zone IV, separation of water from natural gas liquids employing bauxite driers which can be conveniently regenerated (see Petroleum Refining Engineering, W. L. Nelson, 4th Edition, page 234, 1958, McGraw Hill Inc., N.Y.).

Zone V, any absorption process based on pressure-temperature relationships, such as those concisely summarized in Perry's Handbook for Chemical Engineering, 4th Edition, page 14–2, 1963, McGraw Hill Inc., N.Y.

The advantages of the process of this invention are obtained by combining suitably dehydrated acid gas and dehydrated natural gas liquids in either gaseous or liquid form in any proportion which can be suitably and conveniently transported over long distances to another processing plant for separation and recovery of the acid gas content thereof.

Variations and modifications are possible within the scope of the foregoing disclosure and the appanded claims to the invention.

What is claimed is:

1. A process for the preparation and transportation of a mixture of acid gas and natural gas liquids which comprises the steps:

passing a sour natural gas stream comprising natural gas, acid gas, and natural gas liquids into a first separation zone, separating and withdrawing from said first separation zone a first effluent stream comprising a lean natural gas, a second effluent stream comprising an acid gas, and a third effluent stream comprising natural gas liquids, dehydrating said second and third effluent streams, passing an admixture of the resulting dehydrated natural gas liquids and the resulting dehydrated acid gas over a long distance to a second separation zone, and separating and withdrawing from said second separation zone an acid gas stream and a natural gas liquids stream.

2. A process in accordance with claim 1, wherein said admixture is substantially free of water.

3. A process in accordance with claim 1 wherein the moisture content of the admixture is about 50 p.p.m. or less.

4. A process in accordance with claim 1, wherein the admixture contains no measurable amounts of water.

5. A process in accordance with claim 6 further comprising recovering the elemental sulfur content of said acid gas stream.

6. A process in accordance with claim 1 wherein the step of dehydrated said second and third effluent streams comprising passing said second effluent stream into a first drying zone and withdrawing therefrom a dehydrated acid gas stream, and passing said third effluent stream into a second drying zone and withdrawing therefrom a dehydrated natural gas liquids stream.

7. A process in accordance with claim 6 wherein said admixture is obtained by admixing at least a portion of said dehydrated acid gas stream with at least a portion of said dehydrated natural gas liquids stream.

8. A process in accordance with claim 7 further comprising passing at least a portion of said acid gas stream withdrawn from said second separation zone into a third separation zone and withdrawing from said third separation zone a first product stream comprising elemental sulfur.

9. A process in accordance with claim 1 wherein the admixture is essentially free of water.

References Cited

UNITED STATES PATENTS

| | | | |
|---|---|---|---|
| 3,630,666 | 12/1971 | Kunkel | 208—340 |
| 1,762,423 | 6/1930 | Scharpenberg | 208—340 |

HERBERT LEVINE, Primary Examiner

U.S. Cl. X.R.

55—73; 137—3; 423—26

UNITED STATES PATENT AND TRADEMARK OFFICE
CERTIFICATE OF CORRECTION

PATENT NO. : 3,812,030
DATED : May 21, 1974
INVENTOR(S) : Harris A. Clay

It is certified that error appears in the above—identified patent and that said Letters Patent are hereby corrected as shown below:

Column 4, line 19, delete "6" and insert -- 3 --; column 4, line 23, delete "dehydrated" and insert -- dehydrating --; column 4, line 24, delete "comprising" and insert -- comprises --.

Signed and Sealed this

Thirty-first Day of August 1976

[SEAL]

Attest:

RUTH C. MASON
Attesting Officer

C. MARSHALL DANN
Commissioner of Patents and Trademarks